UNITED STATES PATENT OFFICE.

FELIX MEYER, OF AACHEN, GERMANY, ASSIGNOR TO ARTHUR EICHENGRÜN, OF BERLIN, GERMANY.

PROCESS OF OBTAINING A PLASTIC COMPOSITION.

1,175,791.

Specification of Letters Patent. Patented Mar. 14, 1916.

No Drawing. Application filed August 21, 1908. Serial No. 449,718.

*To all whom it may concern:*

Be it known that I, FELIX MEYER, a German subject, and resident of Aachen, Germany, have invented a certain new and useful Process of Obtaining a Plastic Composition, of which the following is a specification.

This invention relates to a new composition of matter intended for the production of coatings, foils, imitations of oil-cloth, india-rubber and leather, so-called patent-leather, *i. e.* varnished or japanned leather, wallpapers, colored paper, moldings, tubes, patterns and other products and objects made of or with the use of acetyl-cellulose.

The new composition of matter is of the nature of a colloidal solution, which may be of varying consistency between the limits of liquid and solid according to requirements, preferably such as can be kneaded and shaped in a cold state. It is produced by treating acetyl-cellulose conjointly with solvents and precipitants or volatile non-solvents.

According to this invention the acetyl-cellulose, if necessary in combination with a non-volatile substance capable of forming a solid solution with said acetyl cellulose and with or without the addition of organic or inorganic matter and filling materials or softening agents, such as oils, etc., is treated with such substances which act as solvents and non-solvents of acetyl-cellulose. The acetyl-cellulose is either first dissolved and then without evaporating the solvent treated with a non-solvent, the mass inspissating under the counteracting effect of the solvents and non-solvents to a state intermediate between solid and liquid, or else, which is more advantageous, as constituting a great saving in solvents, the acetyl-cellulose is treated with a mixture of solvents and non-solvents, whereby the same final result is obtained, namely the desired inspissation of the colloidal acetyl-cellulose solution.

As solvents may be used chloroform, acetone, acetic ether, and the like solvents for the particular kind of acetyl-cellulose that is being used, as precipitants or non-solvents (inspissating agents) water, benzin, benzol, ethyl alcohol, petroleum, oil of turpentine and the like. The concentration *i. e.* degree of inspissation of the colloidal solution of acetyl-cellulose depends on the proportion between solvent and non-solvent; and the condition of the material finally obtained, whether in the form of liquid, syrup or plastic mass, is a function of the concentration or degree of inspissation. Objects of any kind can be formed or molded with the composition, obtained in this way, substances of any kind can be covered or impregnated therewith, organic or inorganic filling materials of any kind be incorporated with same. The composition can be rolled out by machinery to films of very great tenuity or substrata, to which, in consequence of the pressure applied they adhere very tenaciously without penetrating into the substratum itself. If desired use may be made of substances of any kind, for example of waste-material, such as leather, wood or cork meal or powder to produce objects in which the acetyl-cellulose is to form the agglutinant.

Molded objects made with the composition can be taken out of the mold immediately after molding, they retain their shape, harden rapidly, and do not lose much in volume, or exhibit bubbles. When water is used as precipitant or non-solvent, such compositions have the further advantage of being fireproof during the treatment, as the water contained in the composition is sufficient to destroy the inflammability of the volatile solvents, acetone and the like. If the composition is distributed by means of calendars or rollers on sheets or other substrata, the layer may be given any desired relief and configuration by using correspondingly engraved or figured rollers. Objects with thin walls, such as tubes, rigid or flexible, patterns and many others, can be easily produced from the composition. If the composition of matter be sufficiently thick the substrata can be dispensed with; and the material forms in itself an independent substance *e. g.* an imitation of leather.

In the preparation of a large number of other things, for example imitations of oil-cloth, india-rubber cloth and similar material the present method is far simpler and cheaper than the methods of production known hitherto, and produces entirely novel effects. The composition of matter may be applied to a suitable substratum (woven fabric, felt, etc.), for instance by causing it to pass together with the material between the rollers of a calendering machine.

All the products obtained can be made very glossy by the friction of rollers and the like, without damage to the surfaces thus treated.

What I claim as my invention and desire to secure by United States Letters Patent is:—

1. A process of obtaining a composition of matter, consisting in subjecting acetyl cellulose to the conjoint action of a solvent for the particular kind of acetyl-cellulose and of a volatile non-solvent for said acetyl-cellulose.

2. A process of obtaining a composition of matter consisting in subjecting acetyl-cellulose to the conjoint action of a solvent for the particular kind of acetyl-cellulose and of a volatile non-solvent for said acetyl-cellulose, with addition of a non-volatile substance capable of forming a solid solution with said acetyl-cellulose.

3. A process of obtaining a composition of matter consisting in subjecting acetyl-cellulose to the conjoint action of a solvent for the particular kind of acetyl-cellulose and of a volatile non-solvent for said acetyl cellulose which is adapted to inspissate the solution before precipitating the acetyl-cellulose.

4. A process of obtaining a composition of matter consisting in subjecting acetyl-cellulose to the conjoint action of a solvent for the particular kind of acetyl-cellulose and of a volatile non-solvent for said acetyl cellulose which is adapted to inspissate the solution before precipitating the acetyl cellulose, and admixing coloring matter with the thickened solution.

5. A process of obtaining a composition of matter consisting in subjecting acetyl-cellulose to the conjoint action of a solvent for the particular kind of acetyl-cellulose and of a volatile non-solvent for said acetyl-cellulose, with the addition of a non-volatile substance capable of forming a solid solution with said acetyl cellulose, and admixed coloring matter with the thickened solution.

6. A process of obtaining a composition of matter consisting in subjecting acetyl-cellulose to the conjoint action of a solvent for the particular kind of acetyl-cellulose and of a volatile non-solvent for said acetyl-cellulose, with the addition of a non-volatile substance capable of forming a solid solution with said acetyl-cellulose, and admixed filling materials with the thickened solution.

7. A process of obtaining a composition of matter consisting in subjecting acetyl-cellulose to the conjoint action of a solvent for the particular kind of acetyl-cellulose and of a volatile non-solvent for said acetyl cellulose, with the addition of a non-volatile substance capable of forming a solid solution with said acetyl-cellulose, and admixed filling materials and coloring matter with the thickened solution.

In testimony whereof I have signed my name to this specification in the presence of two subscribing witnesses.

FELIX MEYER.

Witnesses:
WILLIAM G. KENTERS,
HENRY QUADFLIEG.